United States Patent
Lim et al.

(10) Patent No.: US 9,318,777 B2
(45) Date of Patent: Apr. 19, 2016

(54) SECONDARY BATTERY HAVING IMPROVED SAFETY

(71) Applicant: LG CHEM, LTD., Seoul (KR)

(72) Inventors: SooHyun Lim, Daejeon (KR); Jae Hyun Lee, Daejeon (KR)

(73) Assignee: LG CHEM, LTD, Seoul (KR)

( * ) Notice: Subject to any disclaimer, the term of this patent is extended or adjusted under 35 U.S.C. 154(b) by 435 days.

(21) Appl. No.: 13/861,920

(22) Filed: Apr. 12, 2013

(65) Prior Publication Data

US 2013/0273426 A1    Oct. 17, 2013

(30) Foreign Application Priority Data

Apr. 13, 2012    (KR) .......................... 10-2012-0038546

(51) Int. Cl.
*H01M 10/42* (2006.01)
*H01M 4/485* (2010.01)
*H01M 4/505* (2010.01)
*H01M 4/525* (2010.01)

(52) U.S. Cl.
CPC .......... *H01M 10/4235* (2013.01); *H01M 4/485* (2013.01); *H01M 4/505* (2013.01); *H01M 4/525* (2013.01); *Y02E 60/122* (2013.01)

(58) Field of Classification Search
CPC . H01M 10/4235; H01M 4/525; H01M 4/505; H01M 4/485; Y02E 60/122
See application file for complete search history.

(56) References Cited

U.S. PATENT DOCUMENTS

2010/0012886 A1    1/2010    Ryu et al.

FOREIGN PATENT DOCUMENTS

| JP | 2011-086464 A | | 4/2011 |
|---|---|---|---|
| JP | 2012-009283 | * | 1/2012 |
| KR | 10-2007-0114411 A | | 12/2007 |
| KR | 10-2008-0095352 | * | 10/2008 |
| KR | 10-2008-0095352 A | | 10/2008 |
| WO | WO 2012/114162 | * | 8/2012 |

OTHER PUBLICATIONS

Xiong et al. Double roles of aluminum ion on surface-modified spinel LiMn1.97Ti0.03O4, Journal of Materials Chemistry (2011), 21(13), pp. 4937-4944.*

* cited by examiner

*Primary Examiner* — Laura Weiner
(74) *Attorney, Agent, or Firm* — Birch, Stewart, Kolasch & Birch, LLP

(57) ABSTRACT

Disclosed is a secondary battery comprising an electrode assembly including a cathode, an anode and a separator interposed between the cathode and the anode, the secondary battery comprising a HF scavenger.

11 Claims, 1 Drawing Sheet

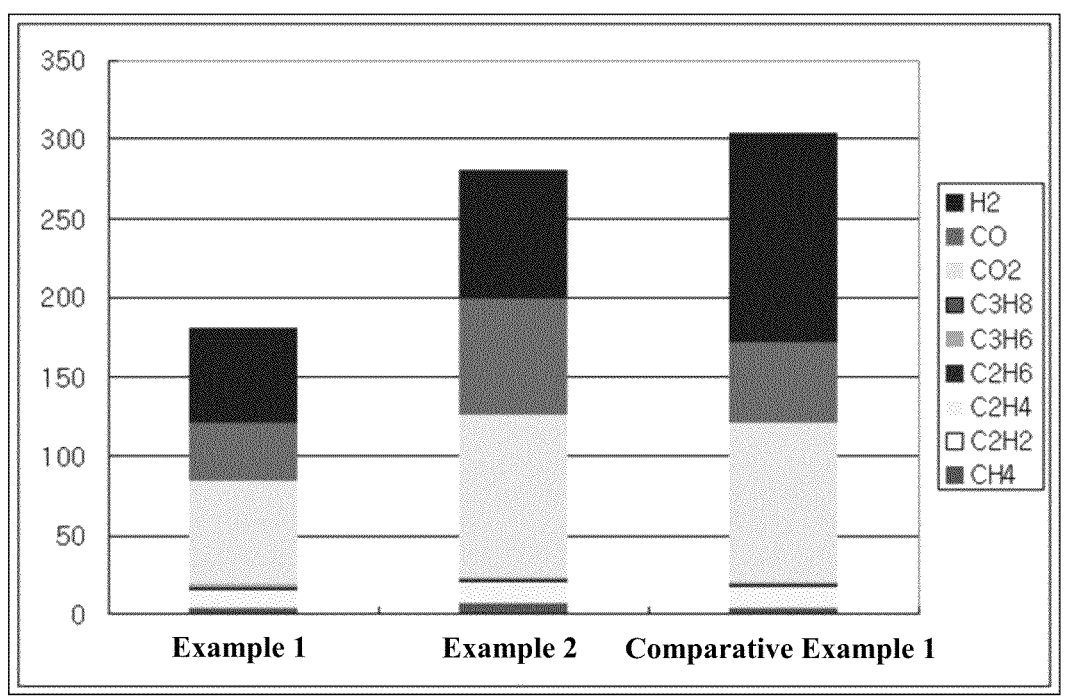

SECONDARY BATTERY HAVING IMPROVED SAFETY

TECHNICAL FIELD

The present invention relates to a secondary battery comprising an electrode assembly including a cathode, an anode and a separator interposed between the cathode and the anode, the secondary battery comprising a HT scavenger.

BACKGROUND ART

Technological development and increased demand for mobile equipment have led to a sharp rise in the demand for secondary batteries as energy sources. Among these secondary batteries, lithium secondary batteries having high energy density and high operating voltage, long cycle lifespan and low self-discharge are commercially available and widely used.

In addition, increased interest in environmental issues has brought about a great deal of research associated with electric vehicles (EVs), hybrid electric vehicles (HEVs) and the like as alternatives to vehicles using fossil fuels such as gasoline vehicles and diesel vehicles which are major causes of air pollution. Nickel-metal hydride (Ni-MH) secondary batteries are generally used as power sources of electric vehicles (EVs) and hybrid electric vehicles (HEVs). However, a great deal of study associated with use of lithium secondary batteries with high energy density, discharge voltage and power stability is currently underway and some of such lithium secondary batteries are commercially available.

A lithium secondary battery has a structure in which a non-aqueous electrolyte comprising a lithium salt is impregnated into an electrode assembly comprising a cathode and an anode, each comprising an active material coated on a current collector, and a porous separator interposed therebetween.

In general, when HF is present in a lithium secondary battery, the moisture decomposes into hydrogen gas during charge and discharge. As a result, a swelling phenomenon occurs. Furthermore, in serious cases, explosion may occur. In addition, HF may cause corrosion of an electrode due to its acidity.

Accordingly, there is an increasing need for methods of removing HF present in the battery.

DISCLOSURE

Technical Problem

Therefore, the present invention has been made to solve the above and other technical problems that have yet to be resolved.

As a result of a variety of extensive and intensive studies and experiments to solve the problems as described above, the present inventors discovered that a secondary battery comprising a HF scavenger present in an electrode or an electrolyte can provide desired effects, as described later. The present invention has been completed based on this discovery.

Technical Solution

In accordance with one aspect of the present invention, provided is a secondary battery comprising an electrode assembly including a cathode, an anode and a separator interposed between the cathode and the anode, the secondary battery comprising a HF scavenger.

As described above, when the secondary battery, in particular, the lithium secondary battery contains moisture, phenomena associated with deterioration in safety such as explosion or swelling may occur.

Such HF may be produced by reaction of moisture with $LiPF_6$ such as a lithium salt. However, it is difficult to completely remove moisture adsorbed on an active material or the like during the battery production process. Accordingly, the adsorbed moisture produces HF, decomposes into hydrogen gas or causes problems associated with safety due to other electrochemical reactions during charge and discharge.

The secondary battery according to the present invention comprises a HF scavenger, as described above, thereby solving these problems.

In one embodiment, the HF scavenger may be contained in the cathode or the anode. The electrode active material, conductive material or the like may function to absorb moisture producing HF, and produced HF can thus be removed by adding a HF scavenger together with the active material or the conductive material to an electrode mix.

In another embodiment, the HF scavenger may be contained in the electrolyte. The electrolyte sufficiently permeates into the cathode and the anode and electrochemically reacts with the electrode. In addition, a lithium salt such as $LiPF_6$ which may produce HF is present in the electrolyte. Accordingly, the produced HF can be removed by incorporating the HF scavenger into the electrolyte.

Any HF scavenger may be used without particular limitation so long as it is not involved in electrochemical reactions of the secondary battery and is capable of removing moisture. Non-limiting examples of the HF scavenger include silane compounds. An example of the silane compounds includes silazane.

The HF scavenger may act as a resistant layer alone, and a reaction by-product of the HF scavenger and moisture may act as a resistant layer. When excess HF scavenger is used, electrochemical performance of the secondary battery may disadvantageously be deteriorated.

In one embodiment, when the HF scavenger is contained in the cathode or the anode, a content thereof is preferably 0.1% to 10%, more preferably 0.1% to 3%, based on the total weight of the cathode mix or the anode mix.

In addition, when the HF scavenger is contained in the electrolyte, a content thereof is preferably 0.1% to 10%, more preferably 0.1% to 3%, based on the total weight of the electrolyte.

The cathode for secondary batteries is fabricated by applying a mixture containing a cathode active material, a conductive material and a binder to a cathode current collector, followed by drying and pressing, and the mixture may optionally comprise a filler.

The cathode current collector is generally manufactured to have a thickness of 3 to 500 μm. Any cathode current collector may be used without particular limitation so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. Similar to the anode current collector, the cathode current collectors include fine irregularities on the surfaces thereof so as to enhance adhesion to the cathode active material. In addition, the cathode current collector may be used in various forms including films, sheets, foils, nets, porous structures, foams and non-woven fabrics.

Examples of the cathode current collector include, but are not limited to, layered compounds such as lithium cobalt oxide (LiCoO₂) and lithium nickel oxide (LiNiO₂) or these compounds substituted by one or more transition metals; lithium nickel manganese cobalt composite oxides with a layered structure represented by LiNi$_x$Mn$_y$Co$_z$O$_2$; lithium manganese oxides represented by Li$_{1+x}$Mn$_{2-x}$O$_4$ (in which 0≤x≤0.33), LiMnO₃, LiMn₂O₃ and LiMnO₂; lithium copper oxide (Li₂CuO₂); vanadium oxides such as LiV₃O₈, LiFe₃O₄, V₂O₅ and Cu₂V₂O₇; Ni-site type lithiated nickel oxides represented by LiNi$_{1-x}$M$_x$O$_2$ (M=Co, Mn, Al, Cu, Fe, Mg, B or Ga, and 0.01≤x≤0.3); lithium manganese composite oxides represented by LiMn$_{2-x}$M$_x$O$_2$ (M=Co, Ni, Fe, Cr, Zn or Ta, and 0.01≤x≤0.1), or Li₂Mn₃MO₈ (M=Fe, Co, Ni, Cu or Zn); LiMn₂O₄ wherein Li is partially substituted by alkaline earth metal ions; disulfide compounds; and Fe₂(MoO₄)₃.

In one embodiment, the cathode active material may comprise a lithium manganese composite oxide with a spinel structure, represented by the following Formula 1:

$$Li_xM_yMn_{2-y}O_{4-z}A_z \quad (1)$$

wherein 0.9≤x≤1.2, 0<y<2, and 0≤z<0.2;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one negative univalent or bivalent anion.

Specifically, the lithium manganese composite oxide may be lithium nickel manganese oxide represented by the following Formula 2:

$$Li_xNi_yMn_{2-y}O_4 \quad (2)$$

wherein 0.9≤x≤1.2, and 0.4≤y≤0.5.

More specifically, the lithium manganese composite oxide may be LiNi$_{0.5}$Mn$_{1.5}$O$_4$ or LiNi$_{0.4}$Mn$_{1.6}$O$_4$.

The conductive material is commonly added in an amount of 1 to 50% by weight, based on the total weight of the mixture comprising the cathode active material. Any conductive material may be used without particular limitation so long as it has suitable conductivity without causing adverse chemical changes in the battery. Examples of suitable conductive materials include graphite such as natural graphite or artificial graphite; carbon black such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and conductive materials such as polyphenylene derivatives.

The binder is a component which enhances binding of an electrode active material to the conductive material and the current collector. The binder is commonly added in an amount of 1 to 50% by weight, based on the total weight of the mixture comprising the cathode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Meanwhile, the anode is prepared by applying an anode active material to an anode current collector, followed by drying and pressing. The anode active material may comprise a conductive material, a binder, a filler and the like, as necessary.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, the anode current collector may be processed to form fine irregularities on the surface thereof so as to enhance adhesion to the anode active materials. In addition, the current collectors may be used in various forms including films, sheets, foils, nets, porous structures, foams and non-woven fabrics.

Examples of the anode active materials that can be used in the present invention include carbon such as non-graphitized carbon and graphitized carbon; metal composite oxides such as Li$_x$Fe₂O₃ (0≤x≤1), Li$_x$WO₂ (0≤x≤1) and Sn$_x$Me$_{1-x}$Me'$_y$O$_z$ (Me: Mn, Fe, Pb, Ge; Me': Al, B, P, Si, Group I, II and III elements of the Periodic Table, halogen atoms; 0<x≤1; 1≤y≤3; and 1≤z≤8); a lithium metal; lithium alloys; silicon-based alloys; tin-based alloys; metal oxides such as SnO, SnO₂, PbO, PbO₂, Pb₂O₃, Pb₃O₄, Sb₂O₃, Sb₂O₄, Sb₂O₅, GeO, GeO₂, Bi₂O₃, Bi₂O₄, and Bi₂O₅; conductive polymers such as polyacetylene; and Li—Co—Ni based materials.

In one embodiment, corresponding to the lithium nickel manganese oxide as the high-voltage cathode active material, the anode active material may comprise lithium metal oxide represented by Formula 3.

$$Li_aM'_bO_{4-c}A_c \quad (3)$$

wherein M' is at least one element selected from the group consisting of Ti, Sn, Cu, Pb, Sb, Zn, Fe, In, Al and Zr;

a and b are determined depending on an oxidation number of M' within ranges of 0.1≤a≤4 and 0.2≤b≤4;

c is determined depending on an oxidation number within a range of 0≤c<0.2; and

A is at least one negative univalent or bivalent anion.

In one embodiment, the lithium metal oxide of Formula 3 may be lithium titanium oxide (LTO) represented by the following Formula 4 and specific examples thereof include Li$_{0.8}$Ti$_{2.2}$O$_4$, Li$_{2.67}$Ti$_{1.33}$O$_4$, LiTi$_2$O$_4$, Li$_{1.33}$Ti$_{1.67}$O$_4$, Li$_{1.14}$Ti$_{1.71}$O$_4$ and the like. There is no limitation as to the composition and type of the lithium metal oxide so long as it is capable of intercalating and deintercalating lithium ions. More specifically, the lithium metal oxide of Formula 3 may be Li$_{1.33}$Ti$_{1.67}$O$_4$ or LiTi$_2$O$_4$ having a spinel structure which does not undergo change of crystal structural during charge and discharge, and is highly reversible.

$$Li_aTi_bO_4 \quad (4)$$

wherein 0.5≤a≤3, and 1≤b≤2.5.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and the electrolyte.

The present invention provides a lithium secondary battery having a structure in which a lithium salt-containing electrolyte is impregnated in an electrode assembly having a structure in which a separator is interposed between the cathode and the anode.

The lithium salt-containing non-aqueous electrolyte is composed of a non-aqueous electrolyte and lithium. Examples of the electrolyte include, but are not limited to non-aqueous organic solvents, organic solid electrolytes, and inorganic solid electrolytes.

Examples of the non-protic organic solvents include N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolytes include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the inorganic solid electrolytes include nitrides, halides and sulphates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoro-ethylene carbonate (FEC), propene sultone (PRS) and the like.

In a preferred embodiment, the lithium salt-containing non-aqueous electrolyte can be prepared by adding a lithium salt such as $LiPF_6$, $LiClO_4$, $LiBF_4$, $LiN(SO_2CF_3)_2$, to a mixed solvent of a cyclic carbonate such as EC or PC as a highly dielectric solvent and linear carbonate such as DEC, DMC or EMC as a low-viscosity solvent.

The present invention provides a battery module comprising the secondary battery as a unit battery and a battery pack comprising the battery module.

The battery pack may be used as a power source of a middle or large sized device requiring high-temperature stability, long cycle properties and high rate properties.

Preferably, examples of middle and large sized devices include, but are not limited to, power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes) and electric scooters (E-scooters); electric golf carts; power storage systems and the like.

Effects of the Invention

As apparent from the fore-going, the secondary battery according to the present invention comprises a HF scavenger, thereby advantageously removing HF present in the battery and improving battery safety.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph showing amounts of gas generated in secondary batteries according to Experimental Example 1.

DETAILED DESCRIPTION OF THE INVENTION

Now, the present invention will be described in more detail with reference to the following examples. These examples are provided only to illustrate the present invention and should not be construed as limiting the scope and spirit of the present invention.

Example 1

90% by weight of $LiNi_{0.5}Mn_{1.5}O_4$ as a cathode active material, 5% by weight of Super-P (conductive material), and 5% by weight of PVdF (binder) were added to N-methyl-2-pyrrolidone (NMP) as a solvent to prepare a slurry, and the slurry was coated on an aluminum foil with a thickness of 20 μm, followed by drying and pressing, to produce a cathode.

Titanium isopropoxide was mixed with lithium hydroxide, followed by baking at a high temperature to prepare $Li_{4/3}Ti_{5/3}O_4$, and 90% by weight of the prepared anode active material, 5% by weight of Super-P (conductive material) and 5% by weight of PVdF (binder) were added to NMP, to prepare an anode mixture slurry. The slurry was coated on an Al-foil with a thickness of 20 μm, followed by drying and pressing, to produce an anode.

The cathode and the anode were laminated using Celgard™ as a separator to produce a battery assembly, and a lithium non-aqueous electrolyte containing ethyl carbonate, dimethyl carbonate and ethyl methyl carbonate at a volume ratio of 1:1:1, and further containing 3 wt % of N,N-diethylaminotrimethylsilane, based on the total weight of the electrolyte, as a HF scavenger and 1M $LiPF_6$ as a lithium salt was added to the battery assembly to produce a lithium secondary battery.

Example 2

A lithium secondary battery was produced in the same manner as in Example 1, except that N,N-diethylaminotrimethylsilane was added as the HF scavenger in an amount of 10 wt %, based on the total weight of the electrolyte.

Comparative Example 1

A lithium secondary battery was produced in the same manner as in Example 1, except that the HF scavenger was not added.

Experimental Example 1

Lithium secondary batteries produced in Examples 1 to 3 and Comparative Example 1 were stored at 55° C. for four weeks and gas generation was analyzed. Results are shown in FIG. 1.

As a result, as can be seen from FIG. 1, the batteries of Examples 1 and 2 according to the present invention exhibited a decrease in amount of generated gas, as compared to the battery of Comparative Example 1. This means that silazane used as a HF scavenger is effective in reducing generation of gas in the battery and considerably improving battery safety.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery comprising an electrode assembly including a cathode, an anode, a separator interposed between the cathode and the anode and an electrolyte, the secondary battery comprising a HF scavenger in the electrolyte, wherein the cathode comprises lithium manganese composite oxide with a spinel structure represented by the following Formula 2 as a cathode active material:

$$Li_xNi_yMn_{2-y}O_4 \qquad (2)$$

wherein $0.9 \leq x \leq 1.2$ and $0.4 \leq y \leq 0.5$;

wherein the anode comprises lithium titanium oxide (LTO) represented by Formula 4:

$$Li_aTi_bO_4 \qquad (4)$$

wherein $0.5 \leq a \leq 3$ and $1 \leq b \leq 2.5$; and wherein the HF scavenger is contained in the electrolyte in an amount of 0.1% to 10%, based on the total weight of the electrolyte.

2. The secondary battery according to claim 1, wherein the lithium nickel manganese oxide of Formula 2 is $LiNi_{0.5}Mn_{1.5}O_4$ or $LiNi_{0.4}Mn_{1.6}O_4$.

3. The secondary battery according to claim 1, wherein the lithium titanium oxide of Formula 4 is $Li_{1.33}Ti_{1.67}O_4$ or $LiTi_2O_4$.

4. The secondary battery according to claim 1, wherein the HF scavenger is a silane compound.

5. The secondary battery according to claim 4, wherein the HF scavenger is silazane.

6. The secondary battery according to claim 1, wherein the HF scavenger is present in an amount of 0.1% to 3%, based on the total weight of the electrolyte.

7. The secondary battery according to claim 1, wherein the secondary battery is a lithium secondary battery.

8. A battery module comprising the secondary battery according to claim 7 as a unit battery.

9. A battery pack comprising the battery module according to claim 8.

10. A device comprising the battery pack according to claim 9.

11. The device according to claim 10, wherein the device is an electric vehicle, a hybrid electric vehicle, a plug-in hybrid electric vehicle or a power storage system.

* * * * *